Figure 1:
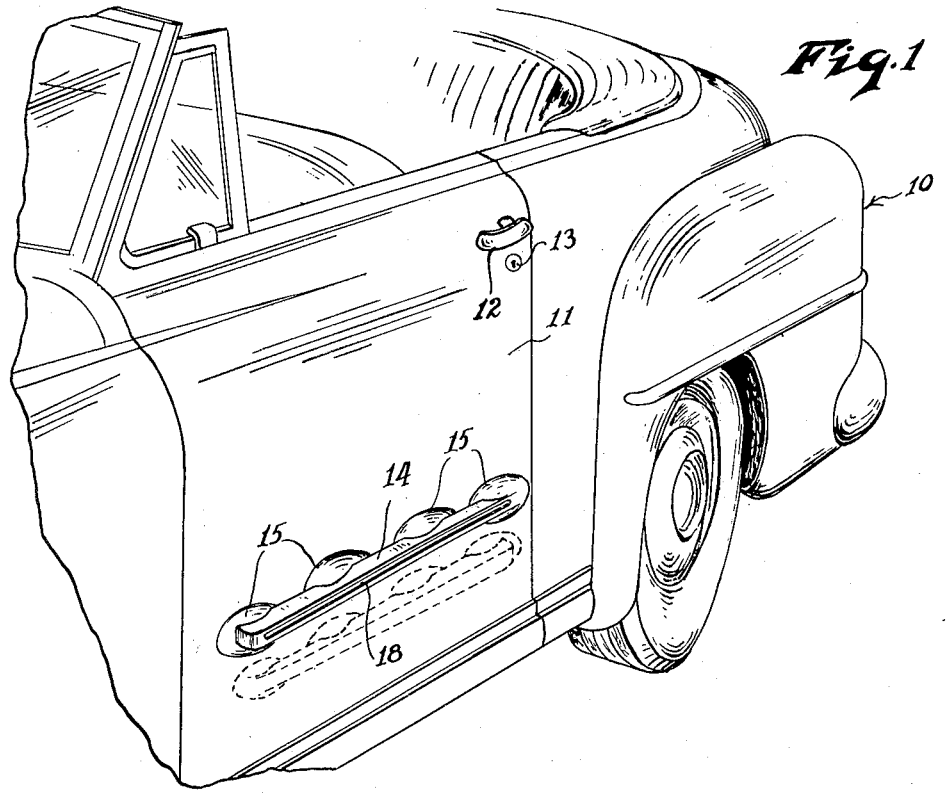

Feb. 14, 1956 M. L. HENDERSON ET AL 2,734,765
DOOR PROTECTING ACCESSORY FOR VEHICLES
Filed Sept. 18, 1951 2 Sheets-Sheet 1

INVENTORS
MARVIN L. HENDERSON
& DANIEL BEDNARCZUK
BY
L. S. Saulsbury
ATTORNEY

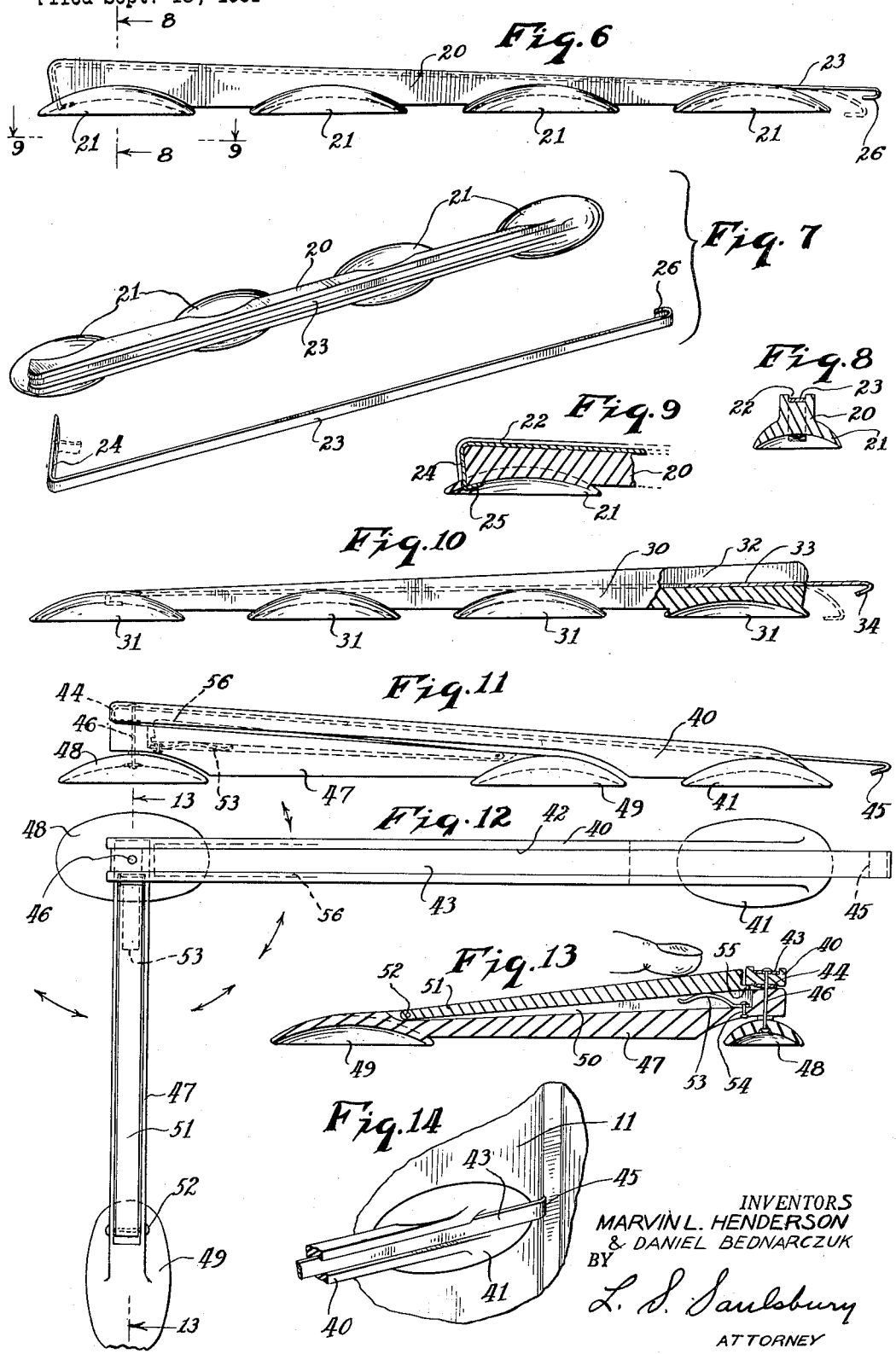

United States Patent Office 2,734,765
Patented Feb. 14, 1956

2,734,765

DOOR PROTECTING ACCESSORY FOR VEHICLES

Marvin L. Henderson, Eglin, Fla., and Daniel Bednarczuk, Flushing, N. Y.; said Bednarczuk assignor to said Henderson Application September 18, 1951, Serial No. 247,068

4 Claims. (Cl. 293—62)

The present invention relates to a door protecting accessory for vehicles and it consists in the combinations, constructions and arrangements of parts herein described and claimed.

Generally there is provided a door protecting accessory for vehicles which is especially adapted for use with automobile doors to protect the same especially when the same is parked in close proximity with other like vehicles at which time there is danger of marring the finish and denting the doors of adjacent vehicles when one or the other of the same allows its door to come into accidental contact with the door of the adjacent vehicle to thereby mar and/or dent the same. The device consists of an elongated body of hard rubber having integrally formed therewith upon its inner side a series of suction cups by which the same may be attached to the outer side of a vehicle door and which is provided in its outer side with a longitudinally extending recess in which may be permanently mounted a strip of decorative metal such as, for example, chromium or the like. In another form the invention may assume, this strip of decorative metal is extended outwardly from the rear end of the device and terminates in a hook which may be engaged over the free edge of the opened door so that, when closed, the device may not be removed therefrom. In still another form the invention may assume there is pivotally mounted at the forward end of the device an auxiliary bumper which is normally latched beneath the main body of the device which may be, when desired, moved to any other desired angular position with respect to the main body and which is provided at its outer end with a suction cup so that the same may be rigidly held in such selected position. Various novel features of the invention will be brought out in the accompanying specification.

It is accordingly an object of the invention to provide devices of the character set forth which are simple in construction, inexpensive to manufacture and yet effective and efficient in use.

Another object of the invention is to provide, in a device of the character set forth, novel locking means forming a part of the invention.

Still another object of the invention is the provision, in devices of the character set forth, of novel decorative metal reinforcing strips forming a part of the invention.

A further object of the invention is the provision, in a device of the character set forth, of novel buffer means for preventing contact of the aforesaid metal strip with other vehicles and extraneous objects when the vehicle door to which the device is attached may be opened.

Still another object of the invention is the provision, in a device of the character set forth, of a novel auxiliary bumper forming a part of the invention.

Figure 2:
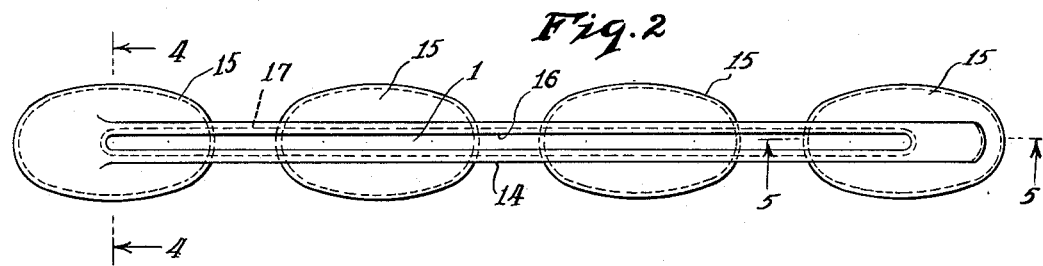
Figure 3:
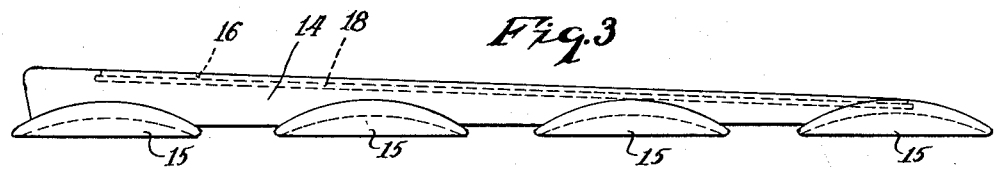
Figure 4:
Figure 5:
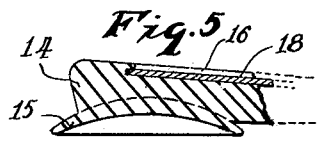

Other and further objects of the invention will become apparent from a reading of the following specification taken in conjunction with the drawing, in which:

Figure 1 is a fragmentary perspective view of a vehicle to the door of which an embodiment of the invention is shown in attached operative position, Figure 2 is a side elevational view of the device illustrated in Figure 1, Figure 3 is a plan view of Figure 2, Figure 4 is a sectional view taken along line 4—4 of Figure 2, Figure 5 is a fragmentary sectional view taken substantially along line 5—5 of Figure 2, Figure 6 is a view similar to Figure 3 but showing a modified form the invention may assume, Figure 7 is an exploded perspective view of the device illustrated in Figure 6, Figure 8 is a sectional view taken along line 8—8 of Figure 6, Figure 9 is a fragmentary sectional view taken substantially along line 9—9 of Figure 6, Figure 10 is a plan view, partly broken away, of a still further embodiment of the invention, Figure 11 is a plan view of another form the invention may assume.

Figure 12 is a side elevational view of the device illustrated in Figure 11, showing an auxiliary bumper forming a part of the invention in extended position, Figure 13 is a sectional view taken along line 13—13 of Figure 12, and Figure 14 is a fragmentary perspective view of the device illustrated in Figures 11 to 13, inclusive.

Referring more particularly to the drawing, there is shown therein an automotive vehicle generally designated at 10 and provided with a side door 11 having a conventional handle 12 and lock 13.

In Figures 2 to 5, inclusive, there is illustrated one embodiment of the invention wherein is provided an elongated body 14 preferably formed of hard rubber and provided upon its inner side with a series of suction cups 15. A longitudinally extending recess 16 is provided in the outer face of the body 14 and the recess is enlarged, as indicated at 17, at both of its inner side edges for the accommodation therein of an elongated strip of metal 18 which acts not only as a reinforcement for the device but also as ornamentation therefor since the same is preferably formed of chromium or chromium plated steel or the like.

It will be apparent that in this form of the invention, the device may be quickly and easily attached by means of the suction cups 15 to the outer side of the door 11 and that the device will form a protection for the door 11 against unwarranted dents, scratches and the like when the door 11 is opened particularly in the neighborhood of another vehicle. It will likewise be apparent that the outer face of the body 14, being formed of rubber, will prevent the device from marring the surfaces of other vehicles with which it may come in contact while at the same time the strip 18 will form a "backbone" or reinforcement for the device and at the same time, since it is displayed outwardly, will act to beautify the vehicle 10 upon which it is placed. If desired, cement may be utilized in addition to the suction cups 15 to permanently affix the device to the outer side of the door 11. It will also be seen in this form of the invention that the body 14 is thicker at its forward end than at its rearward end and that the body tapers gradually toward the rearward end thus providing a pleasing aesthetic effect.

Referring now to that form of the invention illustrated in Figures 6 to 9, inclusive, it will be seen that there is provided a body 20 of hard rubber or the like which likewise is thicker at its forward end than at its rearward end and which is provided upon its inner side with a series of suction cups 21.

The outer side of the body 20 is provided with a longitudinal groove 22 in which is positioned a longitudinally extending strip 23 of chromium or chromium plated metal and which strip is extended downwardly, as indicated at 24, at its forward end and thence through the foremost vacuum cup 21 and thence rearwardly, as indicated at 25, against the inner wall of the foremost vacuum cup 21 to securely hold the strip 23 at its forward end. The rearward end of the strip 23 is extended rearwardly of the body 20 and terminates in a hook 26.

In the operation of this form of the invention, it will be apparent that the hook 26 may first be engaged over the free end of the door 11 when the same is in opened condition and thereafter the suction cups 21 attached to the outer side of the door 11. When the door 11 is closed and the lock 13 utilized to secure the door 11, it will be apparent that the hook 26 will become inaccessible from the outer side of the vehicle 10 and that therefore the device may not be disconnected from the vehicle either by accident or by design.

In the form of the invention illustrated in Figure 10, the construction is identical with that shown in that form of the invention illustrated in Figures 6 to 9, inclusive, with the exception that the body 30 thereof is thicker at its rearward end than at its forward end and that the same tapers gradually throughout its length. The device shown in Figure 10 is provided with suction cups 31 and with a longitudinal groove 32 on its outer side in which is positioned a strip 33 of metal which is preferably chromium plated and which terminates at its rearward end in an outwardly extending hook 34.

Referring now to that form of the invention illustrated in Figures 11 to 14, inclusive, it will be seen that there is provided an elongated body 40 of hard rubber or the like and which extends inwardly and rearwardly and terminates at its rearward end in a suction cup 41 which is formed integrally upon its inner side. The outer side of the body 40 is provided with a longitudinally extending groove 42 in which is positioned an elongated strip 43 of metal similar to the strips hereinabove described and which is provided with a U-shaped portion 44 at its forward end and with a rearwardly extending hook 45 at its rearward end.

A pin 46 extends through the forward end of the body 40 and through the legs of the U-shaped portion 44 and thence through the inner end of an auxiliary buffer 47 and finally extends through a suction cup 48. The outer end of the auxiliary buffer is provided on its inner side with an integrally formed suction cup 49.

The auxiliary buffer is provided in its outer side with a longitudinal groove 50 and a latch arm 51 is pivotally connected, as indicated at 52, in the outer end of the groove 50 and a leaf spring 53 is mounted in the forward end of the groove 50 by means of a rivet 54 or the like and the latch arm 51 bears against the outer end of the spring 53 and is provided at its own free end with a shoulder 55 which is adapted to bear against the underside of the body 40 when the buffer auxiliary arm 47 is moved to angular relation with the body 40. The inner side of the forward portion of the body 40 is provided with a recess 56 to accommodate the free end of the arm 51 when the buffer auxiliary arm 47 and the body 40 are in parallel relation.

In the operation of this last form of the invention, it will be apparent that the same may be locked in position upon the door 11 by utilizing the hook 45 as above described with regard to the hook 26, for example, and that the suction cups 41 and 48 may be utilized to securely position the device upon the door 11. Thereafter, when it is desired to move the auxiliary arm 47 to a desired angular relation to the body 40, as for example to a vertically depending position as shown in Figure 12, it is only necessary to depress the latch arm 51 into the recess 50 against the action of the spring 53 to release the auxiliary arm 47 from its engagement in the recess 56 in the body 40 and to thereafter rotate the auxiliary arm 47 about the pin 46 to the desired position whereupon the suction cup 49 may be also engaged with the outer surface of the door 11 to maintain the same in such selected position. At this time, it will be apparent that the shoulder 55 will prevent further outward movement of the arm 51 by the spring 53.

While only certain forms of the invention have been shown and described herein, it will be readily apparent to those skilled in the art that many minor modifications may be made without departing from the spirit of the invention or the scope of the appended claims.

What is claimed is:

1. A device of the character described for mounting on the side door of a vehicle comprising a bumper comprising a horizontally extending elongated body having a longitudinal groove in its outer face, a strip of metal positioned within said groove, a suction cup formed integrally upon the rear end of the inner face of said body, an auxiliary bumper arm pivoted at its inner end to the forward end of said body, means for latching said auxiliary bumper in parallel relationship to said body, and means for fixing said auxiliary bumper in angular relationship to said body.

2. A device of the character described for mounting on the side door of a vehicle comprising a bumper comprising a horizontally extending elongated body having a longitudinal groove in its outer face, a strip of metal positioned within said groove, a suction cup formed integrally upon the rear end of the inner face of said body, an auxiliary bumper arm pivoted at its inner end to the forward end of said body, means for latching said auxiliary bumper in parallel relationship to said body, and means for fixing said auxiliary bumper in angular relationship to said body, said latching means comprising a groove formed in the outer face of said auxiliary arm, a latching arm pivoted at one of the ends in said last-mentioned groove, a recess in the rear face of said body, and a spring in said last-mentioned groove for normally urging said latching arm into said recess.

3. A device of the character described for mounting on the side door of a vehicle comprising a bumper comprising a horizontally extending elongated body having a longitudinal groove in its outer face, a strip of metal positioned within said groove, a suction cup formed integrally upon the rear end of the inner face of said body, an auxiliary bumper arm pivoted at its inner end to the forward end of said body, means for latching said auxiliary bumper arm in parallel relationship to said body, and means for fixing said auxiliary bumper arm in angular relationship to said body, said means for fixing said auxiliary bumper arm in angular relationship to said body comprising a suction cup formed integrally with the outer portion of the inner face of said auxiliary arm.

4. A device as defined in claim 1 characterized by said body and said auxiliary arm both being formed of hard rubber or the like.

References Cited in the file of this patent

UNITED STATES PATENTS

| | | |
|---|---|---|
| 1,410,343 | Nieschang | Mar. 21, 1922 |
| 1,859,928 | MacCollum | May 24, 1932 |
| 2,070,760 | Straith | Feb. 16, 1937 |
| 2,111,814 | Schulman | Mar. 22, 1938 |
| 2,172,830 | Carlson | Sept. 12, 1939 |
| 2,239,422 | Hayashi | Apr. 22, 1941 |
| 2,531,967 | Bishop | Nov. 28, 1950 |
| 2,536,551 | Johnson | Jan. 2, 1951 |
| 2,611,637 | Neslund | Sept. 23, 1952 |
| 2,675,983 | King | Apr. 20, 1954 |